Jan. 1, 1924

T. M. BENNETT

DEMOUNTABLE RIM

Filed May 23, 1921

T. M. Bennett
Inventor

By Lancaster & Allwine
Attorneys

Jan. 1, 1924.
T. M. BENNETT
1,479,424
DEMOUNTABLE RIM
Filed May 23, 1921
2 Sheets-Sheet 2
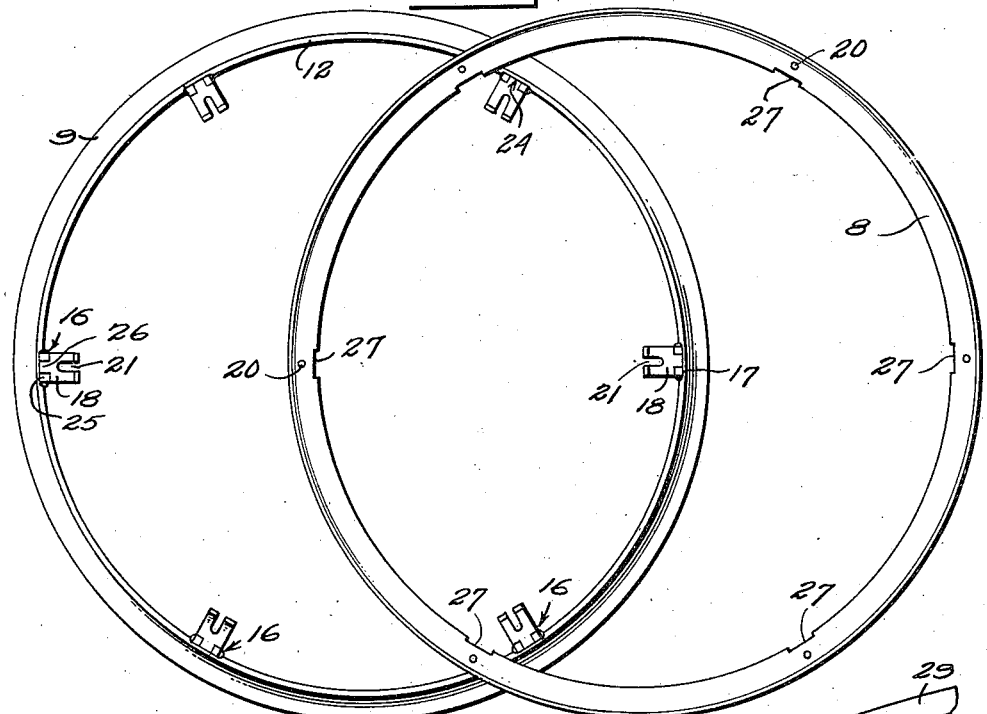
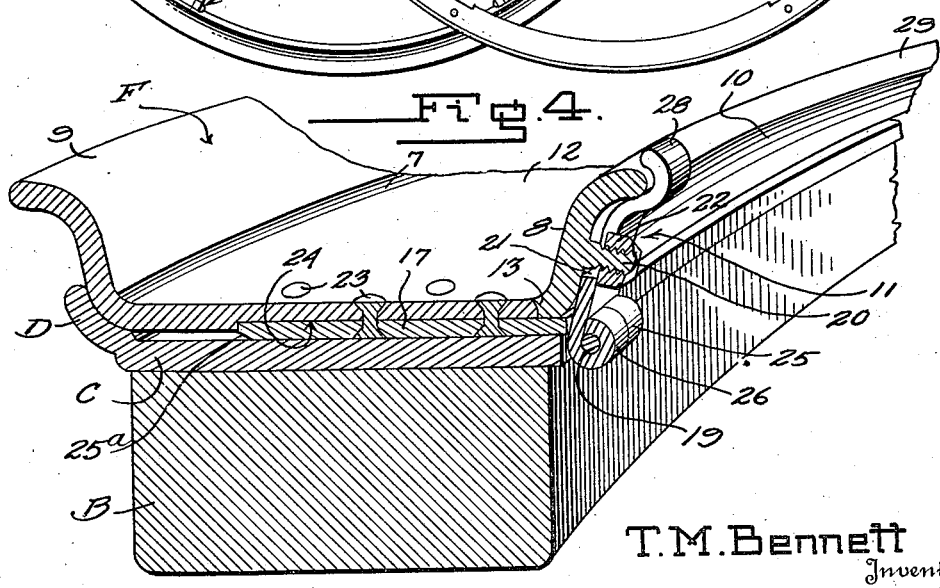
T. M. Bennett
Inventor Patented Jan. 1, 1924.

1,479,424

UNITED STATES PATENT OFFICE.

TOM MOORE BENNETT, OF NEW YORK, N. Y.

DEMOUNTABLE RIM.

Application filed May 23, 1921. Serial No. 471,638.

*To all whom it may concern:*

Be it known that I, TOM MOORE BENNETT, a citizen of the United States, residing at 300 West 54th St., borough of Manhattan, in the county of New York and State of New York, have invented certain new and useful Improvements in Demountable Rims, of which the following is a specification.

The present invention relates to demountable rims for vehicle wheels and of that character which permits the carrying an inflated pneumatic tire on the demountable rim when the latter is on or off the felly of the wheel.

The principal objects of the invention are, to provide a demountable rim so constructed that the tire may be readily assembled on the rim when the same is wholly off the felly of the wheel or when a part of the rim is on the felly and under which latter condition the wheel constitutes a support for the rim part while the tire is being moved or forced thereonto; to provide a circumferentially divided demountable rim which may be dismembered and assembled without the springing of portions thereof as is usually necessary in connection with transversely split rims, thus making it possible to arrange the rim for the reception or removal of the tire without the dangers incident to use of such transversely split rims; and to provide demountable rims which are efficient as a retaining means for the tire, neat in appearance and inexpensive to manufacture.

Another object of the invention is to provide a demountable rim which may be secured to the usual type of wheel felly ring by wedges, bolts and nuts without alteration thereof, or in other words replace the type of transversely split rims now in common use without the necessity of altering the wheel felly portion nor discarding the retaining wedges or lugs now in common use.

Other objects and advantages of the invention will appear in the following detailed description taken in connection with the accompanying drawings, forming a part of this specification, and in which drawings:

Fig. 3 is a face view of the parts of the rim dismembered, one part being set to one side to disclose details.

Fig. 4 is an enlarged view partly in transverse section through the wheel felly and demountable rim and partly in perspective.

Figure 1:
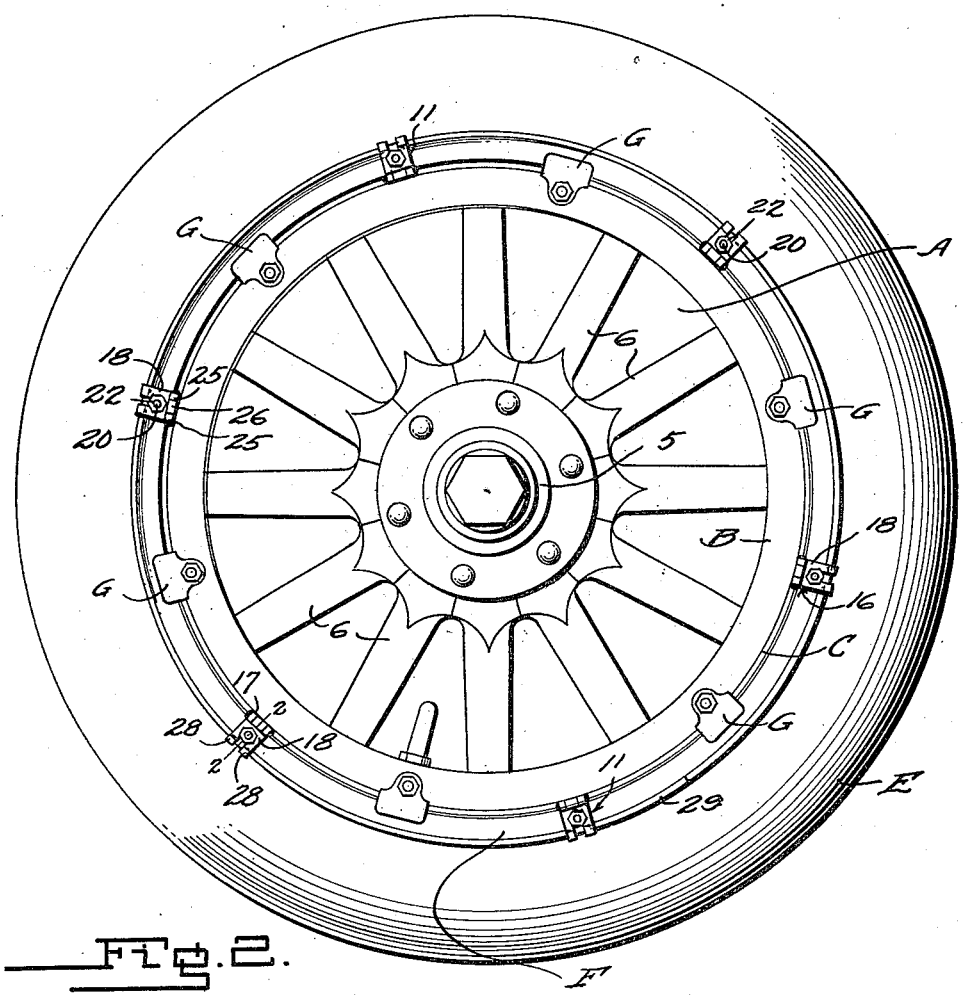
Figure 1 is a face view of a wheel equipped with a demountable rim constructed according to my invention with a pneumatic tire thereon.

In the drawings where similar reference characters refer to similar parts throughout the views: A designates a wheel main body portion including a felly B and felly ring C, having a flange D at one edge; E a tire; F a demountable rim constructed according to the principle of my invention adapted to be slid onto ring C and engage the flange D thereof; and G retaining devices carried by the felly B adapted to retain the rim F in place on the wheel main body portion.

In the example shown, the wheel main body portion A is shown as comprising a hub 5, and spokes 6, in addition to the felly B and felly ring C, but this is merely by way of example, for the demountable rim, may be applied to wheels of types other than those having spokes, such as disc wheels, or so called wire wheels, where the ring C, constitutes the felly.

The demountable rim F comprises two annular members 7 and 8, provided with flanges 9 and 10, respectively, in the example shown, shaped for engagement with the sides of so called straight side tires; and retaining devices adapted to hold the annular members 7 and 8 against circumferential movement one with respect to the other, and against axial movement of one with respect to the other.

Figure 2:
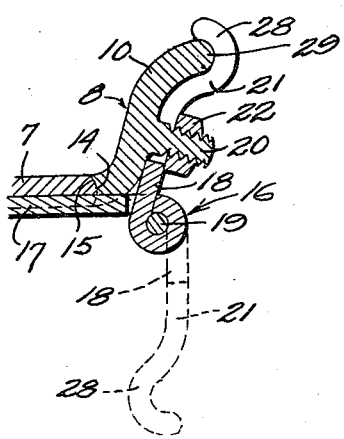
Fig. 2 is an enlarged fragmentary transverse sectional view on the line 2—2 of Figure 1 through the rim only.

In the example shown, the annular member 7 may be considered as the major member, and the annular member 8 as the minor member, the former having a relatively wide collar like portion 12, from which the flange 9 extends, while the member 8 is provided with a relatively narrow portion 13 from which flange 10 extends. In practice the collar like portion 12 extends substantially the width of the felly ring C, and where members 7 and 8 abut, the former may be convex as indicated at 14 while the other may be concave, as clearly shown in Figure 2 of the drawings, so as to fit snugly.

Each retaining device 11 preferably comprises a hinge member 16, comprising leaves 17 and 18, and a pintle 19; a screw threaded stem 20 carried by the flange 10, extending from the outer face thereof, this stem extending through a slot 21 in leaf 18; and a nut 22 for stem 20.

The leaf 17 of each hinge member 16 may be secured to the rim portion 12, in any suitable manner, such as by rivets 23, and it is preferred to provide, at the internal periphery of rim portion 12, recesses 24, receiving a portion of each leaf 17, but in a manner that the leaf projects inwardly of the internal periphery of rim member 7, to act as a spacer between the felly ring C and the annular rim member 7, as clearly shown in Figure 4 of the drawings. It is also preferred to bevel the inner end of leaf 17, as indicated at 25$^a$ to facilitate moving of the demountable rim to operative relation on the wheel main body portion A. The hinge member 16 may simulate, to quite some extent, an ordinary hinge, in which the leaf 17 is provided with spaced apart sleeves 25, while the leaf 18 is provided with a sleeve 26, fitting between the sleeves 25, these sleeves receiving the pintle 19. When disposing the hinged members into fixed relation to the annular member 7, these sleeves are arranged to project inwardly toward the axis of the annular member, so that the leaf 18 may be swung toward said axis, as indicated by dotted lines in Figure 2 of the drawings, and whereby no obstruction is presented for movement of the annular member 8 toward or from annular member 7. The leaf 17 constitutes a projection extending laterally from the annular member 7, and in order to aid in preventing circumferential movement of annular member 8 with respect to member 7, the former may be provided with a plurality of spaced apart recesses 27, one for each retaining device 11, the hinge leaves 17 or projections of the annular member 7 fitting into these recesses 27. The hinged leaves 18 may be shaped to conform to the outer contour of flange 10 and may be provided with hooked end portions 28 to engage over the lip 29 of flange 10, as clearly shown in Figures 2 and 4 of the drawings. These hooked portions of the leaves 18 not only aid in retaining the annular member 8 in proper relation to annular member 7, but also constitute projections which may be readily engaged by a tool for the purpose of swinging these leaves toward or from annular member 8.

The screw threaded stems 20 may be formed integral with the annular member 8, or may be secured thereto in any suitable manner. The slot 21 may extend so as to open to the free end portions of the leaves 18, so as to permit of the removal of mud, clay, or tar, which may accumulate in the slot.

In practice, it is to be observed, that tire E, may be disposed in operative relation to the demountable rim F, and inflated, no matter whether the demountable rim is on or off the wheel main body portion A. Spare rims and tires may therefore be carried, with the tires inflated. If a change of tire is desired, when the rim is mounted on the wheel main body portion, it is not necessary to remove the major rim member 7 from the felly ring C, for with the retaining devices G, carried by the felly, either removed, or swung out of the path of movement of annular member 8, and the removal of the nuts 22, and swinging of the leaves 18 to the dotted position shown in Figure 2 of the drawings, or, as shown in Figure 3 of the drawings, the annular member 8 may be easily removed or replaced, the annular member 7 remaining on the wheel main body portion, which latter acts as a support when forcing the tire casing onto the annular member 7.

The retaining devices G may be of any suitable character adapted to prevent axial movement of the demountable rim with respect to the wheel main body portion.

Changes in details may be made without departing from the spirit of this invention or the scope of the claims.

I claim:

1. A demountable rim for vehicle wheel tires comprising in combination, two separable annular members each including a flange, said flanges adapted to engage opposite sides of a tire adjacent its internal periphery, hinge members, each including two leaves, one leaf being fixedly secured to one of said annular members and the other leaf swingable to engage the outer portion of the flange of the second annular member, and devices carried by the flange of the second annular member for detachably securing the swingable leaves of said hinge members to the same.

2. A demountable rim for vehicle wheel tires comprising in combination, two separable annular members each including a flange, said flanges to engage opposite sides of the tire adjacent its internal periphery, hinge members each including two leaves, one leaf secured to one of said annular members, projecting inwardly of the internal periphery thereof to act as a spacer between the rim and the felly of the wheel, the inner end of the leaf being beveled to facilitate placing of the rim on the felly, and the other leaf swingable to engage the outer portion of the flange of the other annular member, and devices detachably securing the last mentioned leaves of said hinge members to the said outer portion of the flange.

3. A demountable rim for vehicle wheel tires comprising in combination, two separable annular members each including a flange, said flanges to engage opposite sides of the tire adjacent its internal periphery, leaves pivotally carried by one of said annular members adapted to be swung inwardly toward the axis of the rim or outwardly therefrom to engage the outer side of the flange of the other annular member, said leaves provided with slots, screw threaded stems carried by said last mentioned annular member extending outwardly from the flange thereof to project through said slots, and nuts for said stems adapted to bind said leaves into fixed relation to said flange.

4. A demountable rim for vehicle wheel tires comprising in combination, two separable annular members, each including a flange, and arranged to abut with the said flanges engaging opposite sides of the tire in embracing relation, one of said annular members provided with a plurality of spaced apart recesses facing its center, projections extending laterally from the other of said annular members received in the said recesses to prevent circumferential movement of one annular member with respect to the other, and retaining devices normally preventing axial movement of one annular member with respect to the other, including members pivotally carried by said projections radially disposed and secured to the recessed annular member but swingable out of the path of movement of the said recessed annular member for the removal or placing of the tire.

TOM MOORE BENNETT.